(12) United States Patent
Nunez et al.

(10) Patent No.: US 8,613,156 B2
(45) Date of Patent: Dec. 24, 2013

(54) METHOD OF INFORMATION TAG ATTACHMENT/REMOVAL ON SHELVES

(71) Applicant: Grandville Printing Company, Grandville, MI (US)

(72) Inventors: Chris E. Nunez, Ada, MI (US); Robert J. Wojczynski, Grand Rapids, MI (US)

(73) Assignee: Grandville Printing Company, Grandville, MI (US)

( * ) Notice: Subject to any disclaimer, the term of this patent is extended or adjusted under 35 U.S.C. 154(b) by 0 days.

(21) Appl. No.: 13/690,631

(22) Filed: Nov. 30, 2012

(65) Prior Publication Data

US 2013/0086833 A1 Apr. 11, 2013

Related U.S. Application Data

(60) Continuation of application No. 12/760,982, filed on Apr. 15, 2010, which is a division of application No. 11/612,821, filed on Dec. 19, 2006, now Pat. No. 8,020,765.

(60) Provisional application No. 60/793,170, filed on Apr. 19, 2006.

(51) Int. Cl.
  *G09F 3/18* (2006.01)
  *G09F 3/20* (2006.01)
  *A47B 96/06* (2006.01)
  *A47G 29/00* (2006.01)

(52) U.S. Cl.
  USPC ......... 40/661.08; 40/661.03; 40/658; 40/649; 40/661; 248/222.12; 248/444.1; 248/447.1; 248/223.41; 248/220.22; 248/220.41; 248/220.31

(58) Field of Classification Search
  USPC ................. 40/661.08, 661.03, 658, 649, 661; 248/222.12, 444.1, 447.1, 223.41, 248/220.22, 220.41, 220.31
  See application file for complete search history.

(56) References Cited

U.S. PATENT DOCUMENTS

| 1,315,892 A | 9/1919 | Wilson |
| 1,757,964 A | 5/1930 | Hurst |

(Continued)

FOREIGN PATENT DOCUMENTS

WO 9705556 2/1997

OTHER PUBLICATIONS

Henry, "Vestcom Moves HQ Back to Little Rock," Arkansas Business, vol. 22, No. 11 Mar. 21, 2005.

(Continued)

*Primary Examiner* — Paul N. Dickson
*Assistant Examiner* — Syed A Islam
(74) *Attorney, Agent, or Firm* — Price Heneveld LLP

(57) ABSTRACT

A method of providing a shelf-attached tag holder defining an upwardly-open slot for receiving a main price tag and further having a slip-fit top attachment system; and placing a main price tag into the upwardly-open slot in a visible position. The method also includes temporarily attaching a supplemental information tag by sliding a top edge of the supplemental information tag into the downwardly-open front throat with a folded attachment flange providing positive engagement with the slip-fit top attachment system, with the supplemental information tag being positioned in front of the main price tag. The method also includes, after the step of temporarily attaching, a step of pulling the supplemental information price tag downwardly with sufficient force to overcome the positive engagement of the folded attachment flange to thus remove the supplemental information tag without disturbing the main price tag.

4 Claims, 14 Drawing Sheets

(56) References Cited

U.S. PATENT DOCUMENTS

| | | | |
|---|---|---|---|
| 1,904,457 A | | 4/1933 | Healy |
| 2,720,044 A | | 10/1955 | Montalto |
| 2,755,576 A | | 7/1956 | Golden |
| 2,763,947 A | | 9/1956 | Hopp et al. |
| 2,882,625 A | | 4/1959 | Hopp |
| 2,984,031 A | | 5/1961 | Giesecke |
| 3,159,937 A | * | 12/1964 | Barnes ............... 40/446 |
| 3,290,809 A | | 12/1966 | King |
| 3,753,305 A | | 8/1973 | Mueh |
| 3,977,109 A | | 8/1976 | Berry, Jr. et al. |
| 4,016,977 A | | 4/1977 | Krautsack |
| 4,179,138 A | | 12/1979 | Bogdanovic |
| 4,338,739 A | | 7/1982 | Greenberger |
| 4,391,375 A | * | 7/1983 | Joyce ................. 211/85.2 |
| 4,477,048 A | | 10/1984 | Conway |
| 4,483,502 A | | 11/1984 | Fast |
| 4,557,064 A | | 12/1985 | Thompson |
| 4,564,548 A | | 1/1986 | Fast |
| 4,572,380 A | | 2/1986 | Langwell |
| 4,693,441 A | | 9/1987 | Conway |
| 4,716,669 A | | 1/1988 | Fast |
| 4,718,627 A | | 1/1988 | Fast et al. |
| 4,798,014 A | | 1/1989 | Stoerzinger et al. |
| 4,832,207 A | | 5/1989 | Alexander |
| 4,919,377 A | | 4/1990 | Alexander et al. |
| 5,284,689 A | | 2/1994 | Laurash et al. |
| 5,419,066 A | * | 5/1995 | Harnois et al. ............ 40/661.03 |
| 6,026,603 A | * | 2/2000 | Kump et al. ............ 40/661.03 |
| 6,186,555 B1 | | 2/2001 | Rawlings |
| 6,266,906 B1 | | 7/2001 | Nagel |
| 6,360,465 B1 | | 3/2002 | Simpson |
| 6,408,553 B1 | | 6/2002 | Brown et al. |
| 6,519,885 B2 | | 2/2003 | Valiulis |
| 6,566,024 B1 | | 5/2003 | Bourdelais et al. |
| 6,745,509 B1 | | 6/2004 | Lapp |
| 6,817,127 B2 | | 11/2004 | Gottlieb et al. |
| 6,868,629 B2 | | 3/2005 | Fast et al. |
| 7,440,903 B2 | | 10/2008 | Riley et al. |
| 8,020,765 B2 | | 9/2011 | Nunez et al. |
| 2002/0198892 A1 | | 12/2002 | Rychel et al. |
| 2005/0030557 A1 | | 2/2005 | Wiechers |
| 2005/0043848 A1 | | 2/2005 | Wiechers |
| 2005/0126060 A1 | | 6/2005 | Rawlings et al. |

OTHER PUBLICATIONS

Kissel, "Vestcom Helps Retails Court Shoppers," Associated Press Online, Mar. 28, 2006.

"Vestcom Retail Solutions Group to Provide Point-of-Purchase Merchandising Solutions to Food Lion & Kash n' Karry Supermarkets," PR Newswire, Feb. 10, 2000.

"Xerox Extends Media Offerings," Business Wire, Feb. 28, 2000.

Bracke, "High Throughput Industrial Digital Printing," NIP17:International Conference on Digital Printing Technologies, pp. 28-32, Sep. 2001.

Chatow and Samuel, "Digital Labels Printing," NIP19:International Conference on Digital Printing Technologies, pp. 476-481, Sep. 2003.

Vestcom website accessible to the public at least as early as Mar. 14, 2006, and continuously accessible to the public thereafter through the internet archive at http://web.archive.org/web/20060314071113/http://www.vestcom.com/retail/pops ol_adtags.shtml.

* cited by examiner

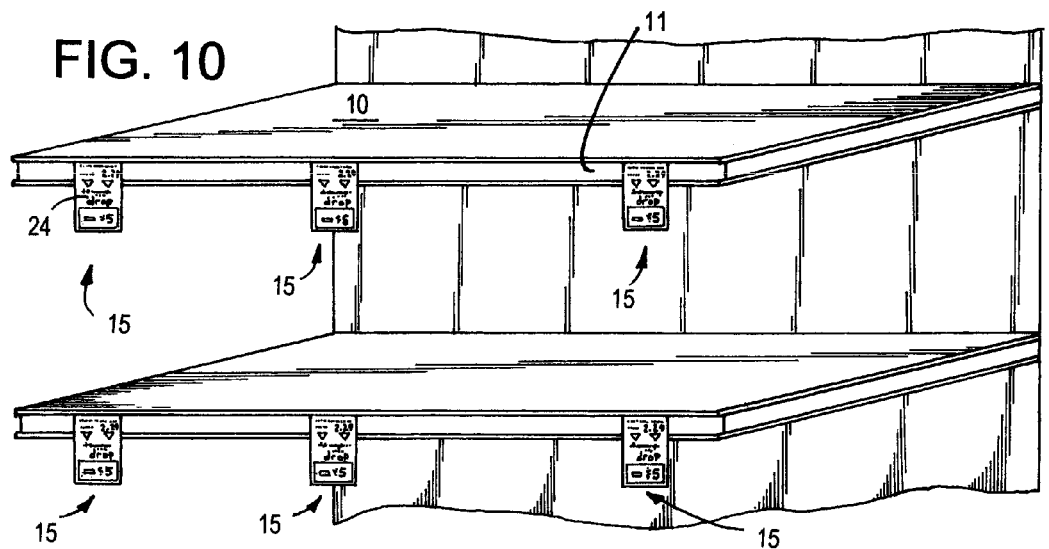
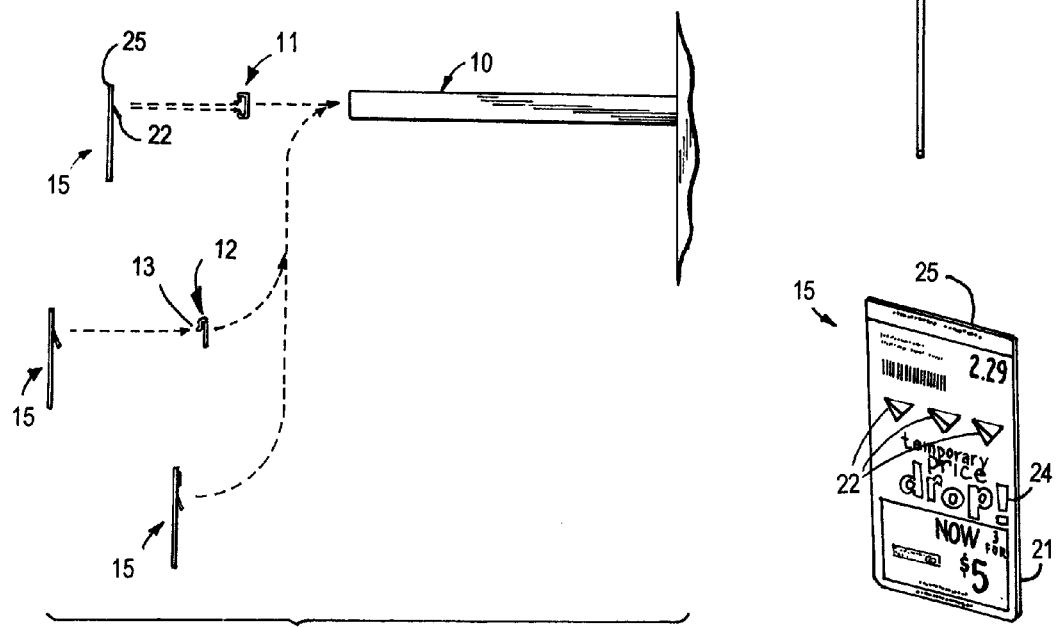
FIG. 10
FIG. 12
FIG. 13
FIG. 11

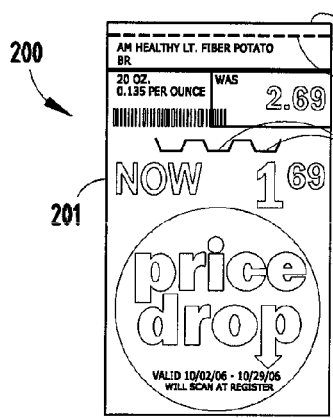
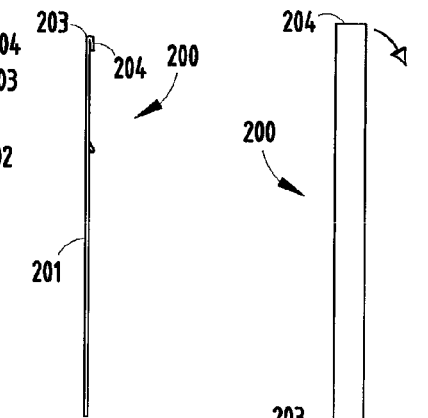
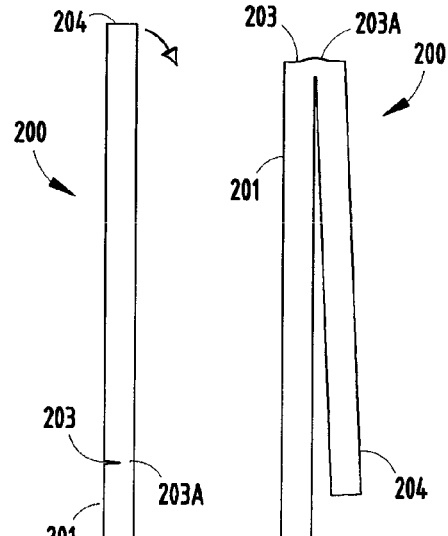
FIG. 14     FIG. 15     FIG. 16     FIG. 16A
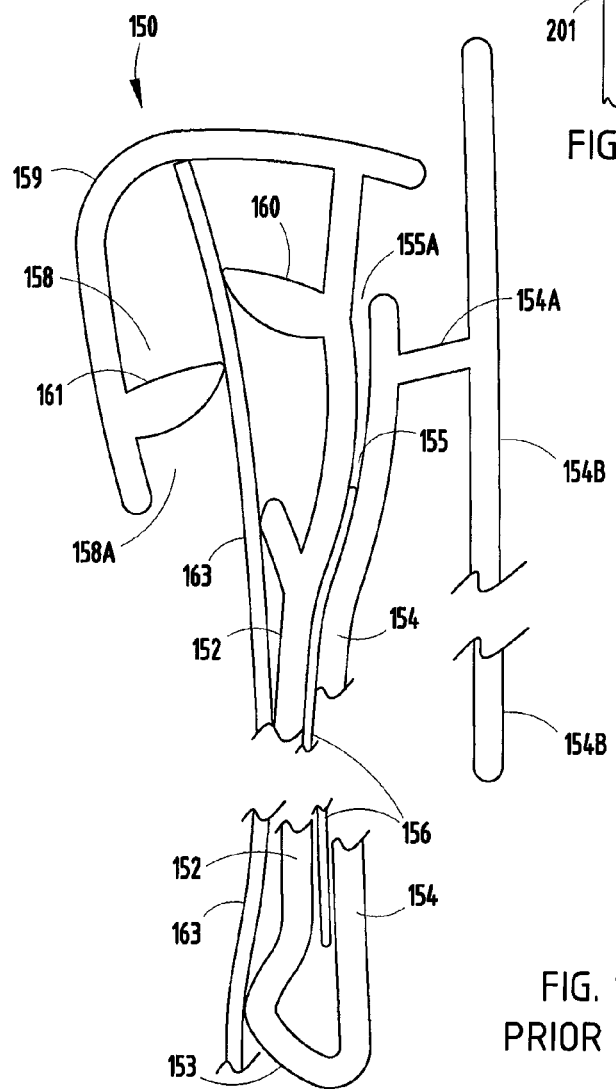
FIG. 17
PRIOR ART

METHOD OF INFORMATION TAG ATTACHMENT/REMOVAL ON SHELVES

This application is a continuation of application Ser. No. 12/760,982 filed Apr. 15, 2010, entitled PRICE INFORMATION TAG; application Ser. No. 12/760,982 is a divisional of application Ser. No. 11/612,821 filed Dec. 19, 2006, now issued as U.S. Pat. No. 8,020,765, issued on Sep. 20, 2011, entitled METHOD OF PRINTING, DISTRIBUTING AND PLACING PRICE INFORMATION, which in turn claims benefit of provisional application Ser. No. 60/793,170 filed Apr. 19, 2006, entitled METHOD OF PRINTING AND DISTRIBUTING PRICE INFORMATION TAGS under 35 U.S.C. §119(e), the entire contents of which are incorporated herein in their entirety.

BACKGROUND

The present invention relates to price information tags attached to shelves under (or over) the products being sold and to other information associated with products for sale. The present tags are particularly attractive due to the multi-color and high resolution of the digital presses that print them and further have features supporting multi-function and flexible/efficient use.

Recently, some stores have begun using a newly-developed extruded price-tag holder attached to a front of in-store shelves. One known extruded price-tag holder (described later in the present disclosure) includes a clear front panel connected along a bottom to a co-extruded opaque rear panel. The front and rear panels define an open-top slot for receiving a "main" price tag, visible through the clear front panel. The clear front panel further includes a frictional three-point slip-fit top attachment system defined by alternating fingers or ridges that allow a "supplemental" price tag to be slipped upwardly into frictional engagement and retained by friction along a top $1/8^{th}$ inch of the supplemental price tag. By this arrangement, a supplemental price tag indicating an "in-store special" can be overlaid on the main price tag, without having to remove the main price tag. The arrangement is advantageous since it allows supplemental price tags to be quickly inserted with a simple upward motion, and also quickly removed by a quick downward pull.

However, the three-point slip-fit attachment system of this extruded price tag holder sometimes does not create enough friction to retain the supplemental price tag, which results in the supplemental price tags being knocked out of position toward a side (such as being knocked to an angled position) or results in the supplemental price tags falling completely off the price tag holder. For example, inadequate friction may be caused by wear on the flanges that form the three-point slip-fit retention system. Also inadequate friction may be caused by the extruded flanges being longitudinally warped or "wavy," which is a fundamental processing problem that often occurs in extrusions due to the extrusion process. This longitudinally warped condition may occur in extrusions as originally manufactured, or may occur over time as the extrusion "creeps" and changes shape over time. For whatever reason, the relationship of the tips of the three flanges intended to cause the frictional retention may vary, resulting in the three flanges in at least some areas not creating sufficient friction on an inserted price tag. An improvement is desired in a price tag so that the price tag will positively and securely engage this three-point attachment system, even if the three flanges are distorted out of their friction-causing positions. However, the improvement must preferably still allow the price tag to be pulled out of the extruded price tag holder without damage to the extruded price-tag holder.

Consumers (as well as consumer protection laws) require accurate information about products being displayed on store shelves. Price information (such as a price change) placed on a shelf "too soon" or "too late" causes considerable consumer dissatisfaction (e.g., out-of-stocks or "mis-stocks") and/or causes significant in-store confusion or delays (e.g., price checks), as well as concern from regulatory agencies. However, getting tags onto shelves is a surprisingly complex and difficult task for a number of reasons. For example, buyers may be negotiating on supplier prices right up to the last possible minute, such that prices and even product availability may be uncertain until the "last possible minute." Product availability and delivery concerns may also cause uncertainty right up to the last possible minute. Management often wants to make product pricing decisions as close as possible to the "on sale" date so that uncertainties about future product availability and consumer purchasing trends and other price-related strategies can be incorporated into the pricing decisions. Thus, a system is desired allowing retail prices to be set as late as possible to allow optimal (last minute) control over retail pricing, and further a system is desired giving greater control to the retail store management late in the printing process.

Aside from timing issues noted above, information management is very difficult. Large stores now carry hundreds of thousands of products, and the logistics of getting timely-printed price information tags in appropriate places on store shelves is a time-consuming, highly-manually-intensive task. An amazing amount of time is spent inefficiently walking from one shelf to another, and from one end of a shelf to another end, as price information tags are attached to shelves under associated product. Further, this often leads to errors, such as tags being put under the wrong product, or tags simply not being put up at all. Further, attachment of the tags must be secure and long-lasting, yet inexpensive and easily engaged. Thus, a system is desired allowing tags to be securely attached, with minimal risk of mis-location, with secure but low-cost attachment systems. Further, it is preferable that a particular tag be able to be attached in multiple ways, given that many stores have different attachment mechanisms on their shelves.

Recent studies show that product sales can potentially be increased if the price information tags have high-quality product pictures and color on them. However, this adds greatly to the cost and lead times required for printing the price information tags. Specifically, in order for pictures to be placed on tags, the data for the pictures must be combined with price information, arranged for printing, and then printed. This greatly complicates printing of price information tags, since it compounds problems associated with getting accurate price information onto the tags, with getting accurate pictures onto the tags. Also, the quality of the pictures is very important, since poor photographs will potentially result in the consumer implying poor quality to the store and/or to the products being sold.

Some stores have attempted to reduce the lead time for providing price information tags by having in-store printing capabilities. However, it is difficult to control the quality of in-store printing for many reasons. High-quality printing equipment is expensive, and it is often not cost-justified to purchase a high-quality machine for each of several different stores. Further, the ability to produce high quality pictures is closely related to skilled machine operators and good quality printing materials and maintenance of the printing machine. Thus, it is difficult to control the quality of on-site printing machinery over time.

Digital presses are relatively new machines, and are capable of producing extremely high-quality pictures at high speeds. Software does exist for managing work flow and information to the digital presses. For example, see Wiechers patent application publications 2005/0030557 A1 and 2005/0043848 A1. However, to the present inventor's knowledge, the advantages and abilities of digital presses have not been used in the environment of price information tags and displays, where customized real-time information is used in conjunction with attachment technology to form tags and displays having particular structure facilitating their use in a just-in-time manner to optimize their value to a retail store.

Thus, a system and method having the aforementioned advantages and solving the aforementioned problems is desired.

SUMMARY OF THE PRESENT INVENTION

In one aspect of the present invention a method of providing supplemental/temporary product information for products on store shelves includes providing a store shelf with a front edge and a tag holder on the front edge, the tag holder having front and rear panels defining an upwardly-open slot for receiving a main price tag and further having a slip-fit top attachment system at a top of the front panel that includes a downwardly-open front throat defined by protrusions; and placing a main price tag into the upwardly-open slot in a position visible through the front panel. The method also includes providing a supplemental information tag with a tag body and a folded attachment flange connected to the body by a fold and having a downward-extending free edge; and temporarily attaching the supplemental information tag by sliding the top edge of the supplemental information tag into the downwardly-open front throat with the downward-extending free edge of the folded attachment flange being biased outwardly by the fold to provide positive engagement with one of the protrusions of the slip-fit top attachment system, with the supplemental information tag being positioned in front of the main price tag. The method also includes later, after the step of temporarily attaching, a step of pulling the supplemental information price tag downwardly with sufficient force to overcome the positive engagement of the folded attachment flange to thus remove the supplemental information tag without disturbing the main price tag, thus temporarily attaching and later removing the supplemental information tag without disturbing the main price tag.

In another aspect of the present invention, a method of providing temporary product information for products on store shelves without removing existing product price tags includes providing a store shelf with a front edge and a tag holder on the front edge, the tag holder defining an upwardly-open slot and further having a slip-fit top attachment system forward of the upwardly-open slot; placing a main price tag into the upwardly-open slot in a position visible from a position in front of the tag holder; providing a supplemental information tag with a tag body and a folded attachment flange along a top edge; temporarily attaching the supplemental information tag over the main price tag by extending the folded attachment flange into the front throat with the folded attachment flange securely engaging the slip-fit top attachment system, with the supplemental information tag being positioned in front of the main price tag; and removing the supplemental information tag by pulling sharply downwardly with sufficient force to overcome the secure engagement of the folded attachment flange and thus remove the supplemental information tag but without disturbing the main price tag.

In another aspect of the present invention, a combination for providing temporary product information for products on store shelves without removing existing product price tags includes a store shelf with a front edge and a tag holder on the front edge, the tag holder defining an upwardly-open slot and further having a slip-fit top attachment system forward of the upwardly-open slot. The combination also includes a main price tag positioned in the upwardly-open slot in a position visible from a position in front of the tag holder; a supplemental information tag with a tag body and a folded attachment flange along a top edge; the folded attachment flange of the supplemental information tag securely engaging the slip-fit top attachment system, but the folded attachment flange being sufficiently flexible so that the supplemental information tag can be removed by pulling sharply downwardly on the supplemental information tag to bend and thus overcome the secure engagement of the folded attachment flange and thus remove the supplemental information tag but without disturbing the main price tag.

These and other aspects, objects, and features of the present invention will be understood and appreciated by those skilled in the art upon studying the following specification, claims, and appended drawings.

BRIEF DESCRIPTION OF DRAWINGS

FIG. 10 is a perspective view showing a pair of store shelves with price information tags thereon.

FIGS. 11-12 are perspective and side views of an alternative price information tag.

FIG. 13 is a side view showing three different attachment schemes supported by the tag shown in FIGS. 12-13.

FIGS. 14-15 are plan and side views of a price information tag, including novel attachment structure.

FIGS. 16-16A are enlarged fragmentary views of a top of the price tag shown in FIG. 15.

FIG. 17 is a side view of a prior art extruded price-tag holder for attachment to a front of an in-store shelf for supporting products for sale in the store.

DESCRIPTION OF PRIOR ART

Figure 1:
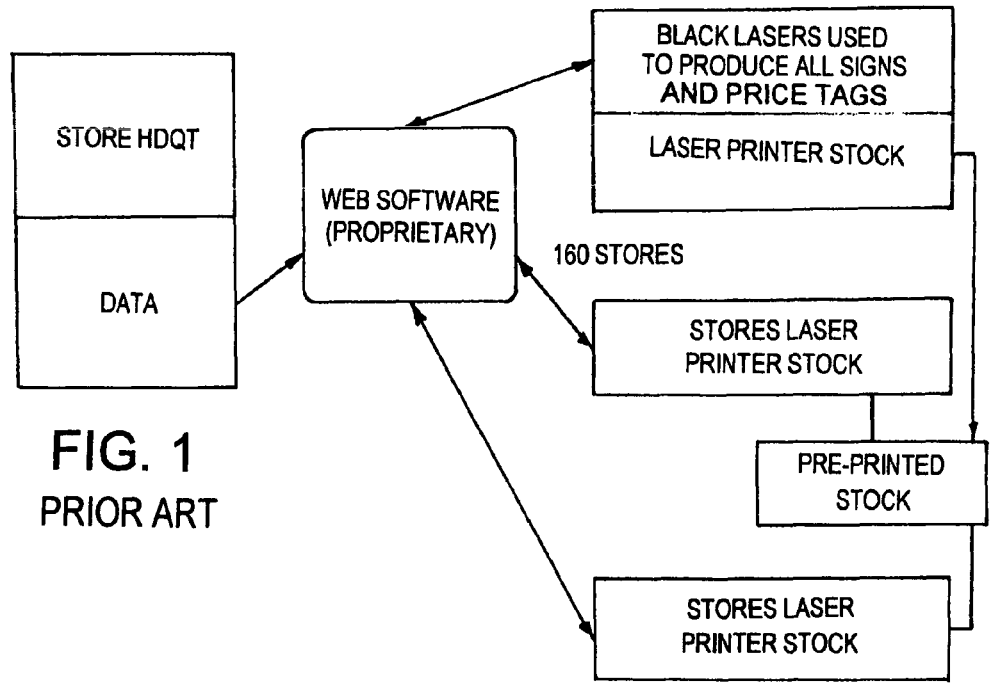
FIG. 1 is a flow chart showing a typical system in prior art for printing price information tags.

In some stores, point-of-purchase signs and shelf tags are printed in black, such as by using laser printers located in the stores. Store employees manipulate pre-determined print batches using web-based software, load pre-printed perforated shells (e.g. stock paper with pre-printed information thereon), print, separate, and then place the signs in their stores on a daily and weekly basis. (See FIG. 1.) Notably, a major part of the activity occurs "in-store." This system requires significant pre-printed inventory, multiple black laser printers, on-site personnel for operating the printers, and is relatively labor intensive. This prior art system typically cannot produce extremely high-quality color pictures due to inherent limitations of the laser equipment, poor maintenance of the printing equipment and/or overuse of spent toner cartridges, etc.

A prior art extruded price tag holder 150 (FIG. 17) has recently been developed for attachment to a front of in-store shelves 151. The extruded price tag holder 150 includes a front half made of clear material including clear front panel 152 and flanges 159-162. The front panel 152 is connected along a bottom 153 to a co-extruded opaque rear half including a rear panel 154, stem 154A and attachment flange 154B. The front and rear panels 152 and 154 define an open-top slot 155 with top throat 155A for receiving a "main" price tag 156, visible through the clear front panel 152. A shelf-attached panel 156B extends parallel back panel 156 and is connected to it by a spacer stem 156A. The clear front panel 152 further includes a frictional three-point slip-fit top attachment system 158 that includes a downwardly open front throat 158A defined by a hood flange 159 and alternating fingers 160, 161 and 162. The fingers 160-162 allow a flat "supplemental" price tag 163 to be slipped upwardly into the throat 158A into frictional engagement such that it is (presumably) retained by friction along a top ¼ inch of the supplemental price tag 163. By this arrangement, a supplemental price tag 163 indicating an "in-store special" can be overlaid on the main price tag 156, without having to remove the main price tag 156. The supplemental price tags now used are flat sheets. The arrangement is advantageous since it allows the supplemental price tags to be quickly inserted with a simple upward motion, and also quickly removed by a quick downward pull. However, there are problems associated with maintaining a relationship of the three-point attachment system of fingers 160, 161 and 162, such that price tags 163 (which are flat sheets) may be knocked out of position or simply fall out due to poor frictional engagement. This is unacceptable and problematic, either early in the life of the holder 150 and especially with wear and passage of time on the holder 150.

DETAILED DESCRIPTION OF PREFERRED EMBODIMENTS

The present inventive method of printing customized price information tags includes providing: a digital press capable of printing very high resolution multi-color pictures/photographs/graphics at high speed; a data management system with computer hardware connected for internet access; a database of stored information such as pictures, photographs, and symbols; and a supply of sheets having a suitable stiffness (i.e., that resist folding, bending, and wrinkling, and that are durable for good long term appearance) and having a high surface quality (i.e., that provide good appearance of digitally printed fonts and pictures) for use as price information tags attached to a store shelf. Updated information is received electronically via the internet, and combined with selected elements from the stored information using a data management system to generate customized tag data, which is communicated to the digital press to print customized multi-color price information tags and displays. The tags are cut to size and cut to include integral attachment tabs/barbs. The customized tag data is arranged to print tags in a series corresponding to product arrangement (i.e., "plan-o-gram" arrangement) of particular store shelves. The customized price information tags can be printed, cut and shipped on a just-in-time basis and in a predetermined sequence within just a very few hours, such as within 24 hours of receiving the "real-time" digital information off the internet.

Figure 2:
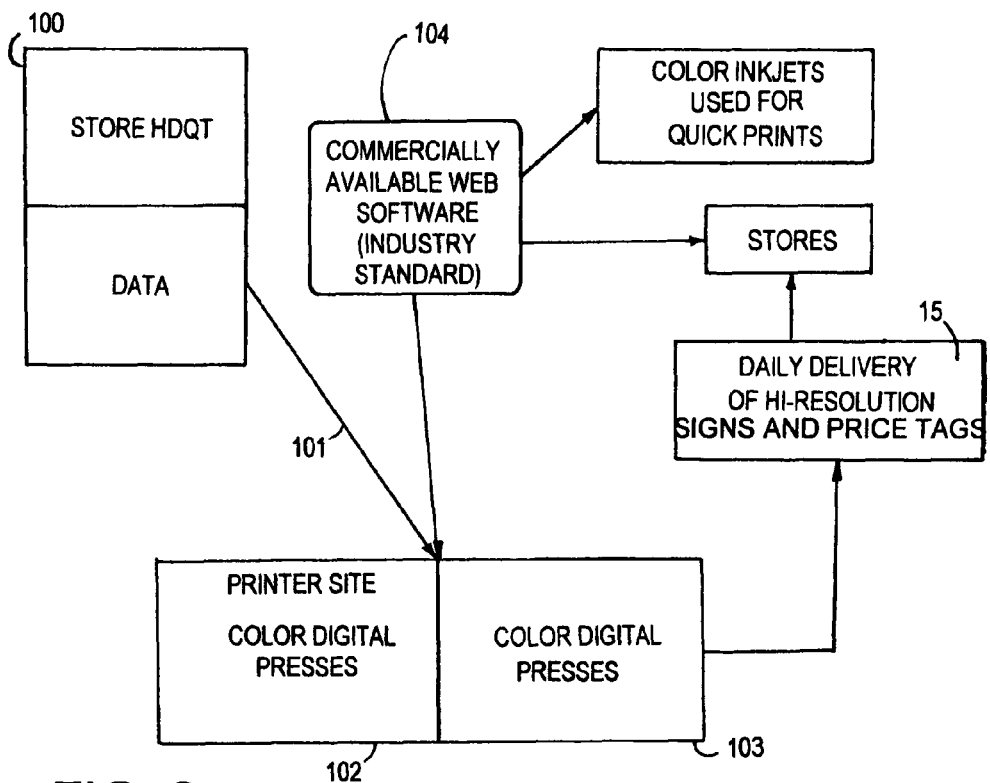
FIG. 2 is a flow chart showing a new inventive system for producing price information tags using a digital press.

FIG. 2 shows a system embodying the present invention, where box 100 illustrates a site with store employees (such as buyers or decision makers at a corporate headquarters) input price information/basic tag data via an internet connection 101 to a printer company/site 102 with digital presses. The printer company also has (or has access to) a database 103 of pictures, photographs, symbols, and images; and combines the tag information from the store employees to generate customized price information tags 15 (or displays) on a just-in-time basis. The high-resolution tags 15 and/or signs are delivered daily to the different retail store locations. The management of data is controlled by a web software 104 based on an industry standard, such as by using AccessVia™ software, HP Yours Truly™ software, Printable Technologies™ software or XMPIE™ software. The software 104 is commercially available and the industry standards for communication are known in the art by those skilled in this art, such that they do not need to be described in detail in this application for an understanding of the present inventive concepts.

Figure 3:
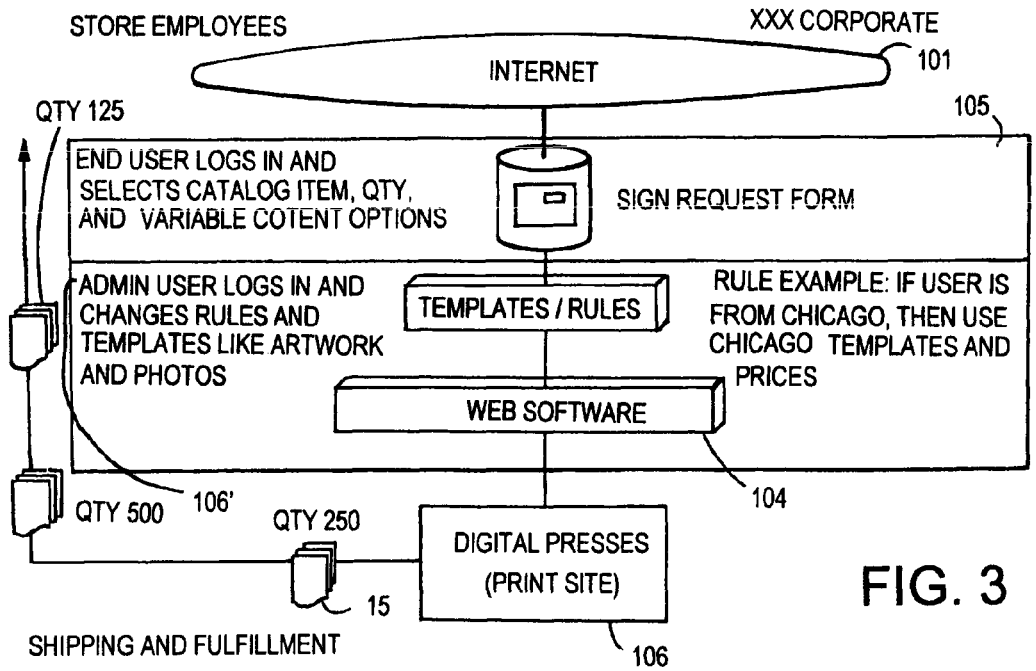
FIG. 3 is a flow chart showing a data management system with internet connection for receipt of information from store employees, and showing management of data to the digital presses.

FIG. 3 shows additional detail of the data management software, which includes the internet connection 101, a "sign request" form 105 for filing out by the end user, an administrator user 106' having templates/rules for managing the data and a background control software such as by using the web software 104. The manipulated "massaged" customized tag data is routed to the digital press(es) 106 and through in-house control systems for maintaining a particular sequential order of the price information tags 15. The tags 15 are cut to shape, packaged, and shipped to individual retail store locations in quantities as ordered. Notably, it is contemplated that any digital press could work in the present system, and that digital presses are commercially available, such as HP Indigo™ digital presses, and Xerox I-Gen digital presses.

Figure 4:
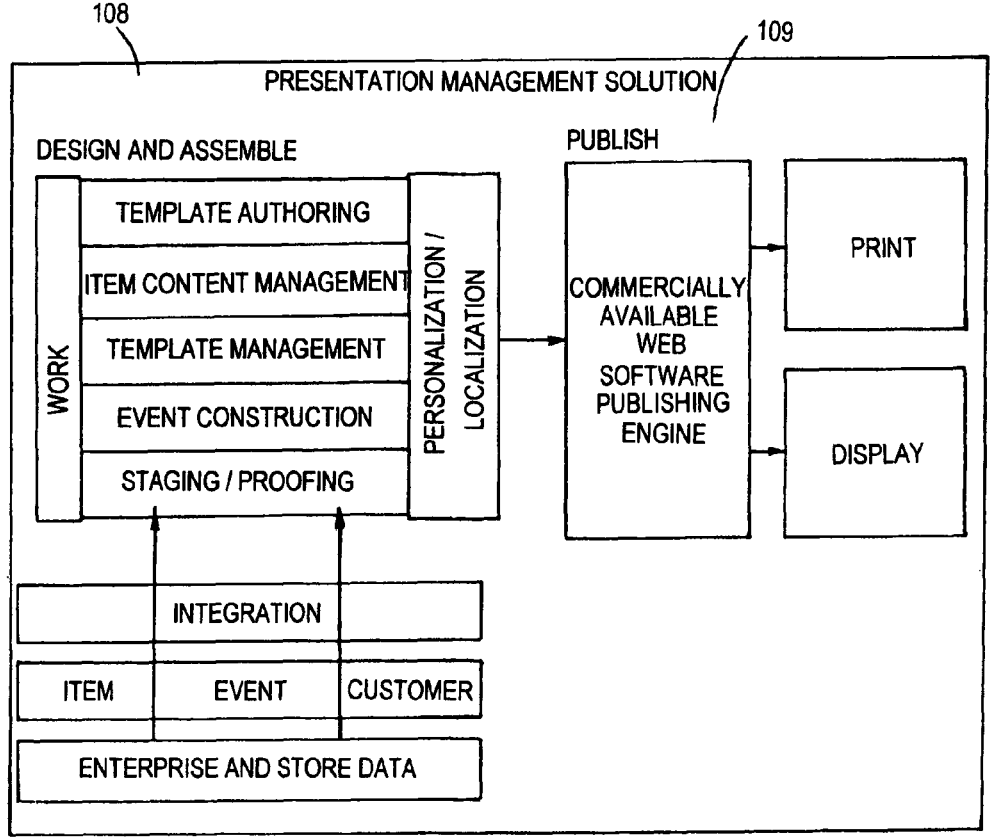
FIG. 4 is a flow chart showing details of the data management system.

FIG. 4 shows additional details of the software management tool, including its design and assembly stage 108 and its publishing stage 109. The design and assembly stage 108 includes steps such as template authoring, content management, template management, event construction, staging and proofing, as well as integration of various elements such as stored data, timing, customer and event controls. The publishing stage 109 includes a publishing engine that permits viewing as a display prior to viewing as a printed product.

Figure 5:
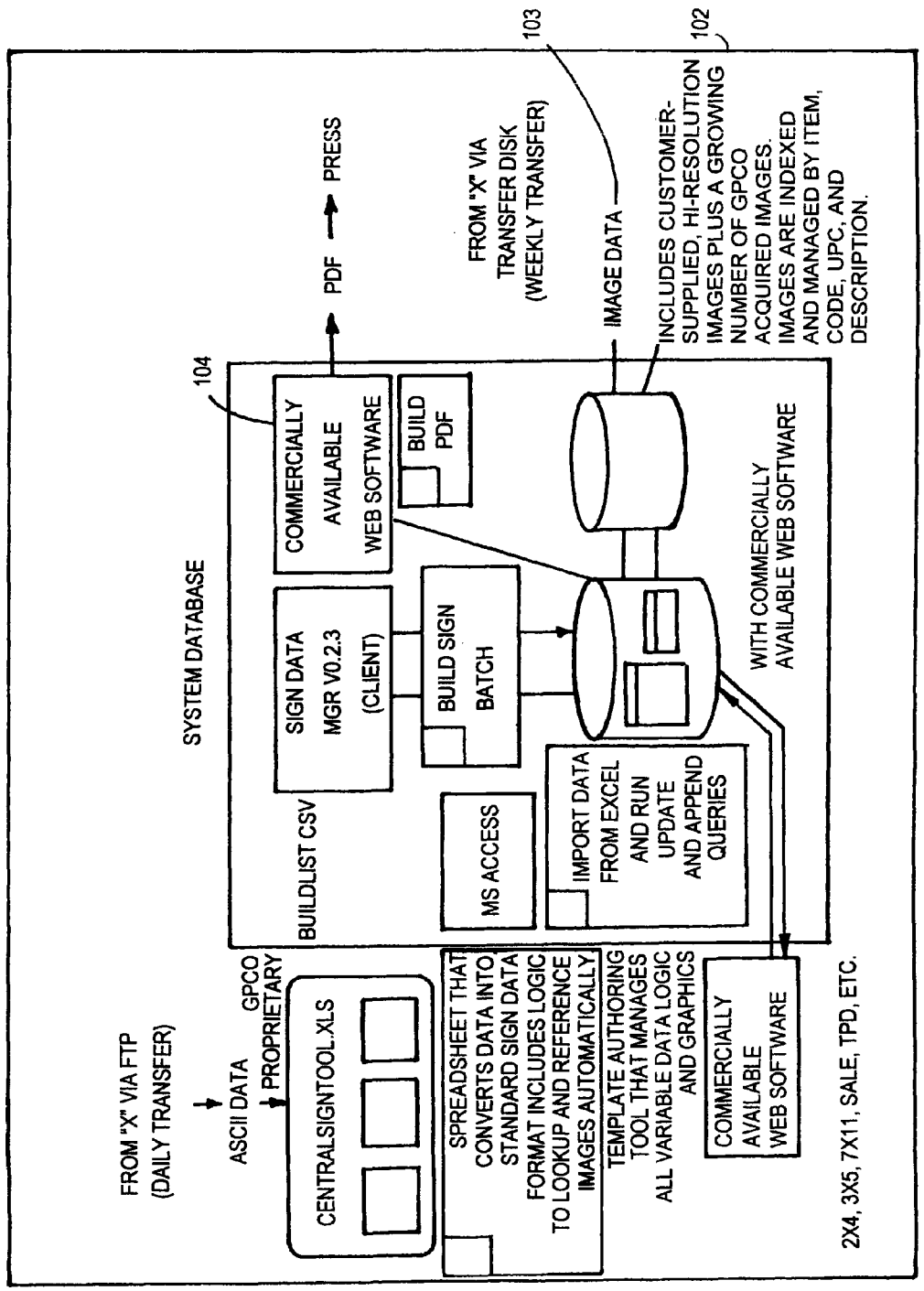
FIG. 5 is a flow chart showing details of an exemplary system actually used in a test situation/pilot project.

FIG. 5 discloses the system components working in and around the system database, including inputs and outputs to the basic system. In particular, input comes from a file-transfer-protocol web site at the print site 102 as ASCII data, and is manipulated and then fed to the software 104. The software 104 accesses a sign data manager and image data to generate customized tag data based on an authorizing software, generating a PDF image data (i.e., customized price information tag data) which is fed to the digital press.

Figure 5A:
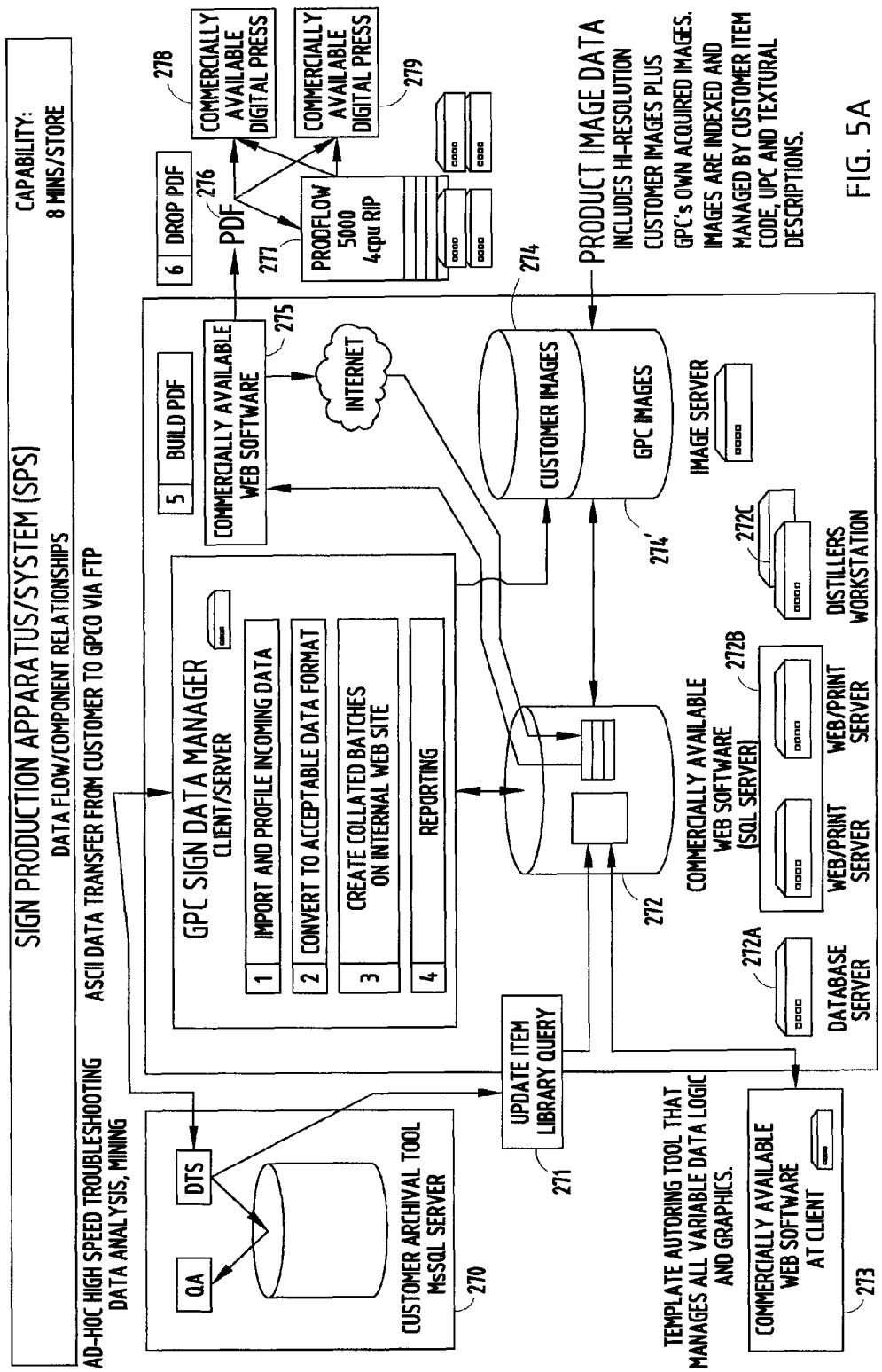
FIGS. 5A-5C are flow charts disclosing a high speed sign production system using internet, digital press printing, and coordination software, FIG. 5A showing data flow, FIG. 5B showing server operations, and FIG. 5C showing hardware and hardware interconnection.

FIG. 5A shows a high speed sign (and tag) production apparatus and system capable of receiving and assembling data from archived and internet-received and other data sources, and capable of providing same to digital presses to create on a very short turn-around basis a variety of high quality printed signs and price information tags and other display products. The apparatus is highly automated, and capable of provided printed signs and tags potentially in less than 30 minutes of receiving data input from a customer, and more preferably as low as within 8 minutes of receiving data input through the internet by a client company. The illustration of FIG. 5A shows both data flow and inter-relationship/interaction of components. A customer archival tool/software 270 is maintained on a SQL server 272 (SQL means standard query language), and allows for quality analysis (QA) such as high speed troubleshooting and data analysis, and includes digital data transmission software (DTS). The archival software 270 generates an update query 271 for updating an item library of information in a main SQL server 272. The main SQL server 272 is run by commercially available database control/manager software 273, includes a database server 272A, multiple web/print servers 272B, and distiller workstations 272C. Notably, these components can be added via simple edits to the manager software 273, and do not require a major re-design or reconfiguration of the interconnected system, such that the present system is "scalable". (In other words, components can be added on a modular basis, and the apparatus/system does not require major redesign for each expansion and increase in system capability.) Sign data manager software 273 (such as AccessVia.db) controls the main SQL server 272 and imports and profiles incoming data, converts it to an acceptable format, creates collated batches, and generates reports via the main SQL server 272. The sign data manager software 273 manages customer images 274 and proprietary images 274' in creating the collated batches and reports. The manager software 273 inputs arranged data to web-interface software 275, which in turn generates pdf files 276 that are communicated to the product flow control hardware 277 and to the digital presses 278 and 279.

Figure 5B:
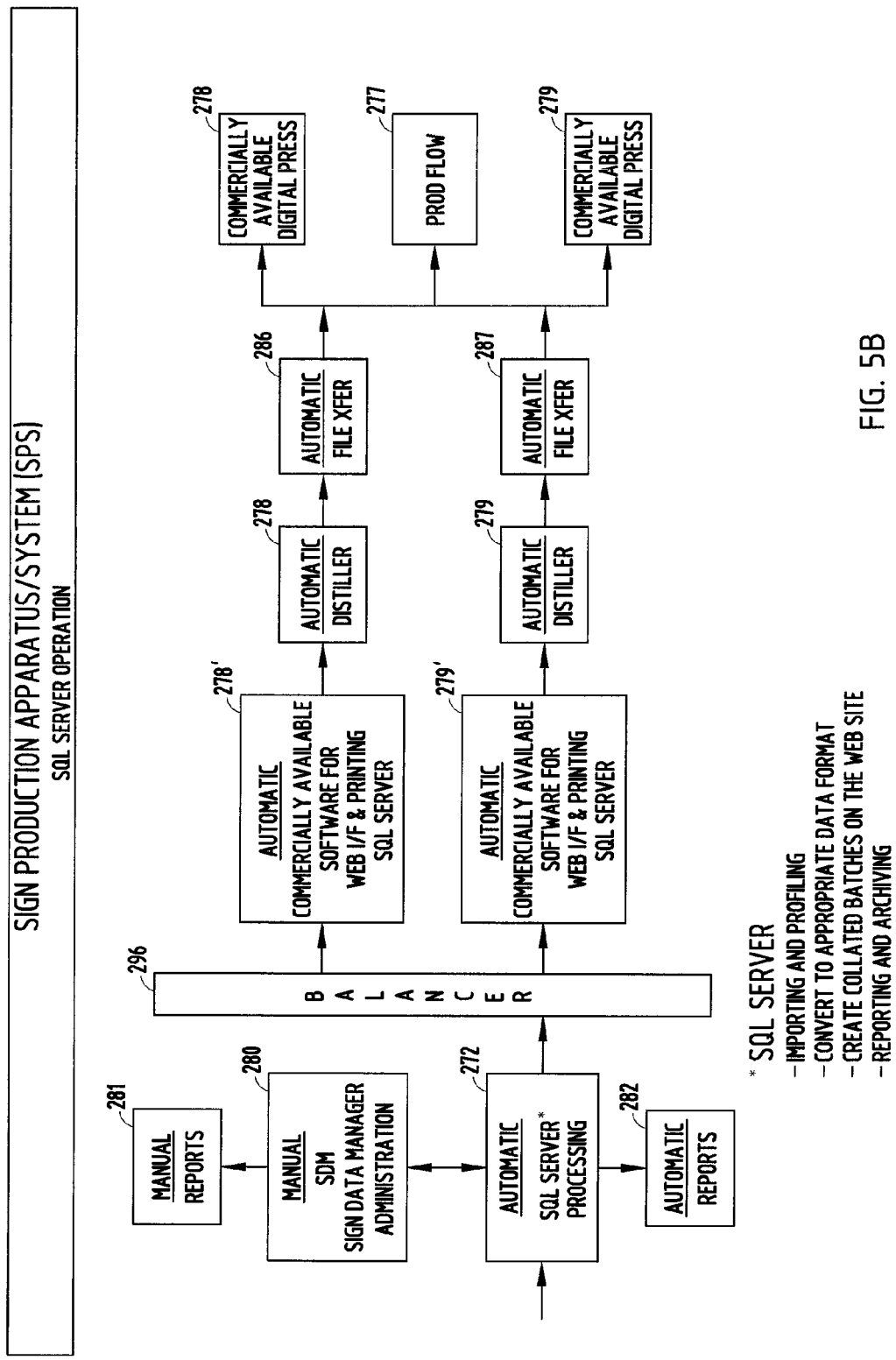

FIG. 5B illustrates the automated operation of the SQL server 272 and the related software. The main SQL server 272 is controlled via an administration station 280 to generate manual reports 281 and automatic reports 282. The main SQL server 272 inputs data to a data load balancer 296 (see FIG. 5C), which balances data flow by automatically creating a web interface and printing data "stream" 278' and 279' for respective automatic distillers 278 and 279, which in turn transfer the data "streams" in file transfer steps 286 and 287 to the product flow control hardware and software 277 and to the digital presses 278 and 279. It is noted that balancers are known in the computer industry and are used in large data processing systems, such that a more detailed explanation is not required.

Figure 5C:
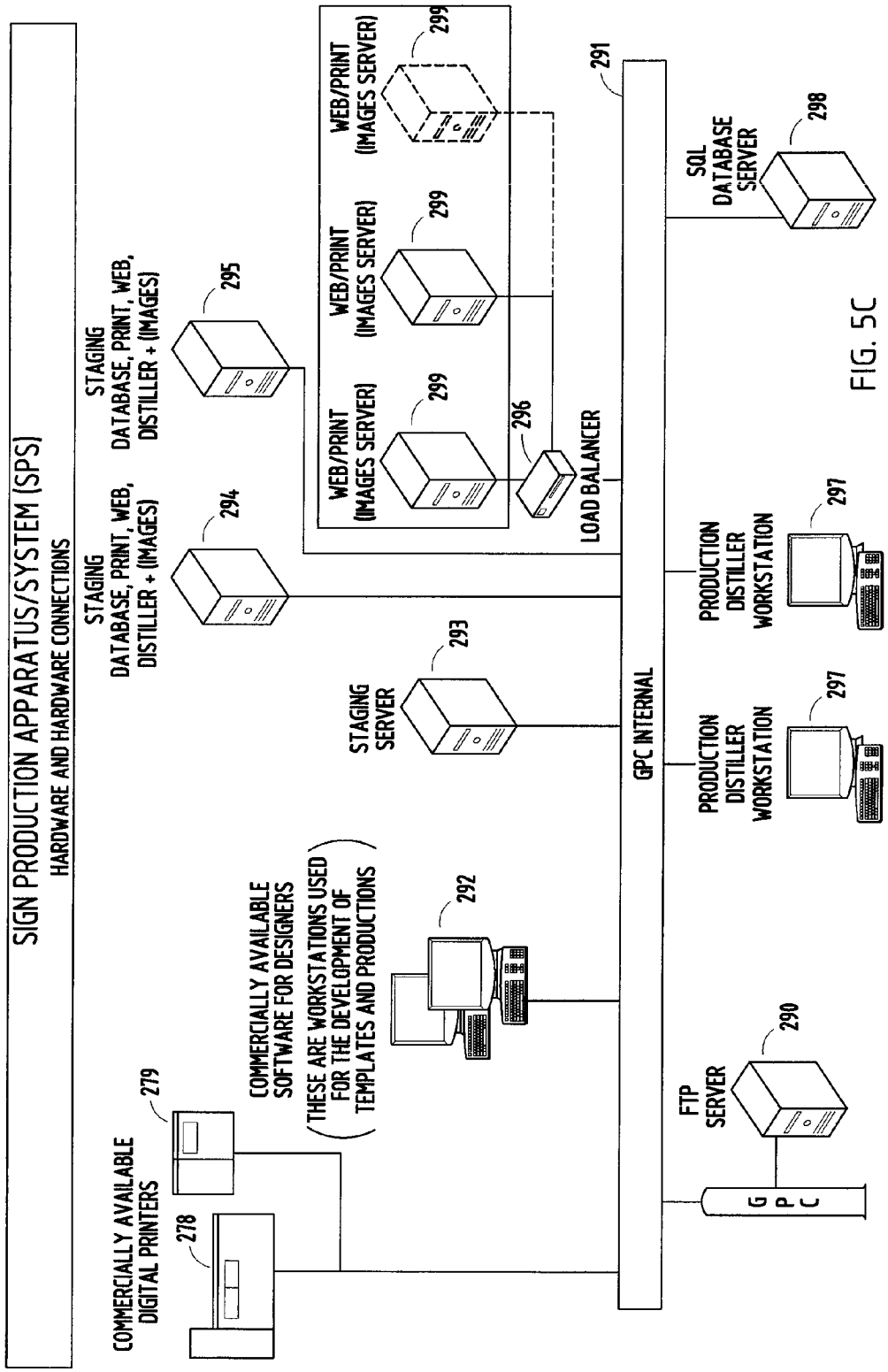

FIG. 5C shows the hardware and inter-connection of items in FIGS. 5A and 5B. A file transfer protocol (FTP) server 290 inputs data received at the FTP web site from the internet and makes it available on the internal intranet 291. Designer workstations with PCs 292 are connected to the intranet 291 and programmed with commercially available software. Also operably connected are a staging server 293, a staging database server 294, a production database server 295, a load balancer 296, production distiller workstations 297, and an SQL database server 298. The load balancer 296 is operably connected to web/print servers 299 and to digital presses 278-279. Notably, the present system is scalable without major reconfiguration nor system adaptation. In other words, the present system can be increased in size and capability relatively easily and without major system redesign by adding additional designer workstations, production distiller workstations, and additional web/print servers.

Figure 5D:
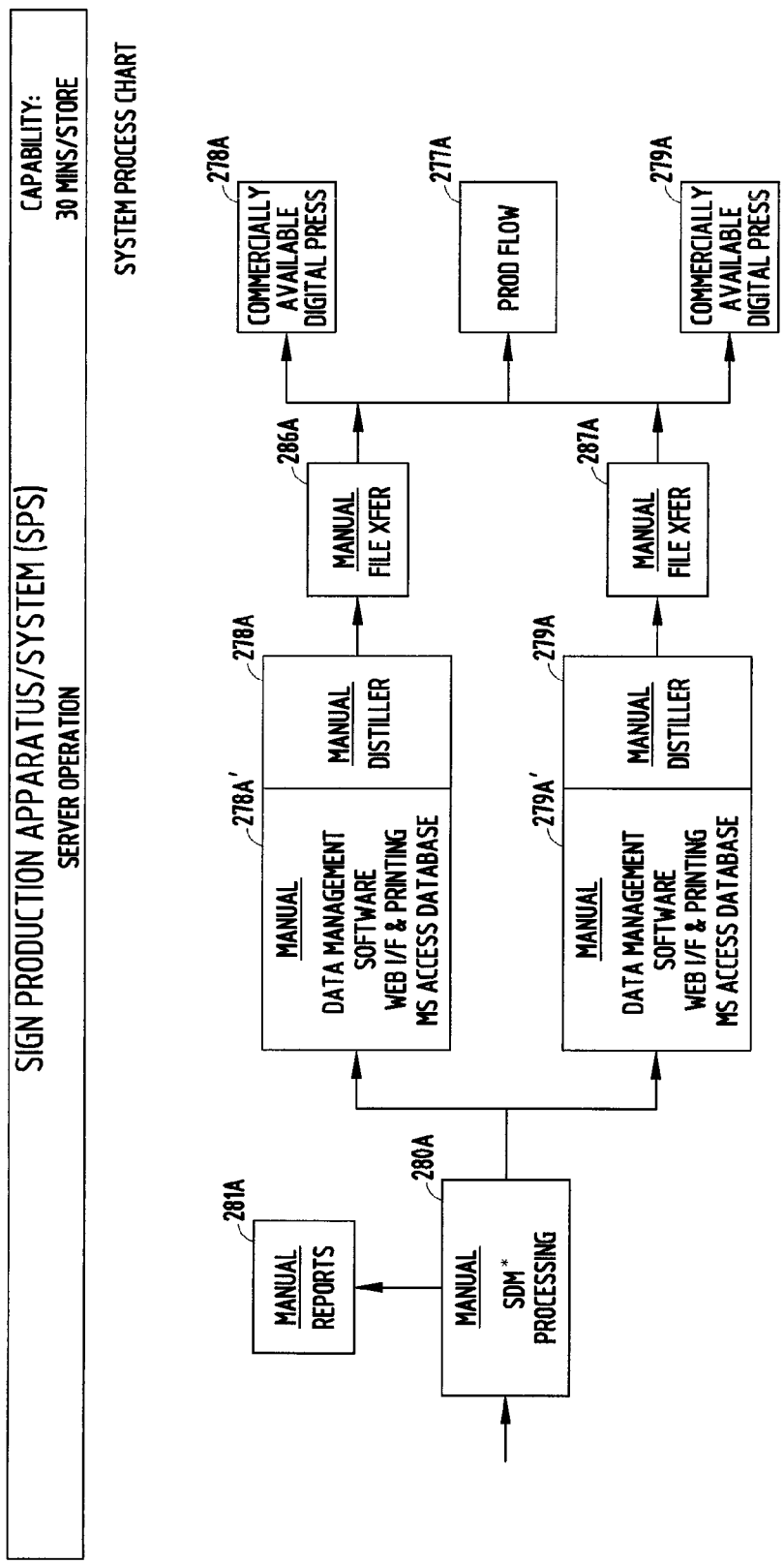
FIG. 5D is a flow chart similar to FIG. 5B but showing a modified/simplified sign production system.

The apparatus and system of FIGS. 5A-5C are relatively automated. A modified system (FIG. 5D) is contemplated. The appearance and system of FIG. 5D is similar to that of FIG. 5B, but the modified system does not include a balancer, nor an automatic SQL server. Further, the WEB I/F and printing step, the distilling step, and the file transfer steps are manual. Notably, components 280A, 278A, 278A', 279A, 279A', 286A, 287A, and 277A in FIG. 5D are similar in function and arrangement to components 280, 278, 278', 279, 279', 286, 287, and 277 in FIG. 5B, but in FIG. 5D they are programmed for manual operation. This system is still considered to be a high speed sign (and tag) production system. By way of comparison to the system of 5B, this system's capability (i.e., the system of FIG. 5D) can provide printed signs (and price information tags) from a digital press within about 30 minutes of receiving data input through the internet by a client company. The illustration shows both data flow and inter-relationship/interaction of components.

Figure 6:
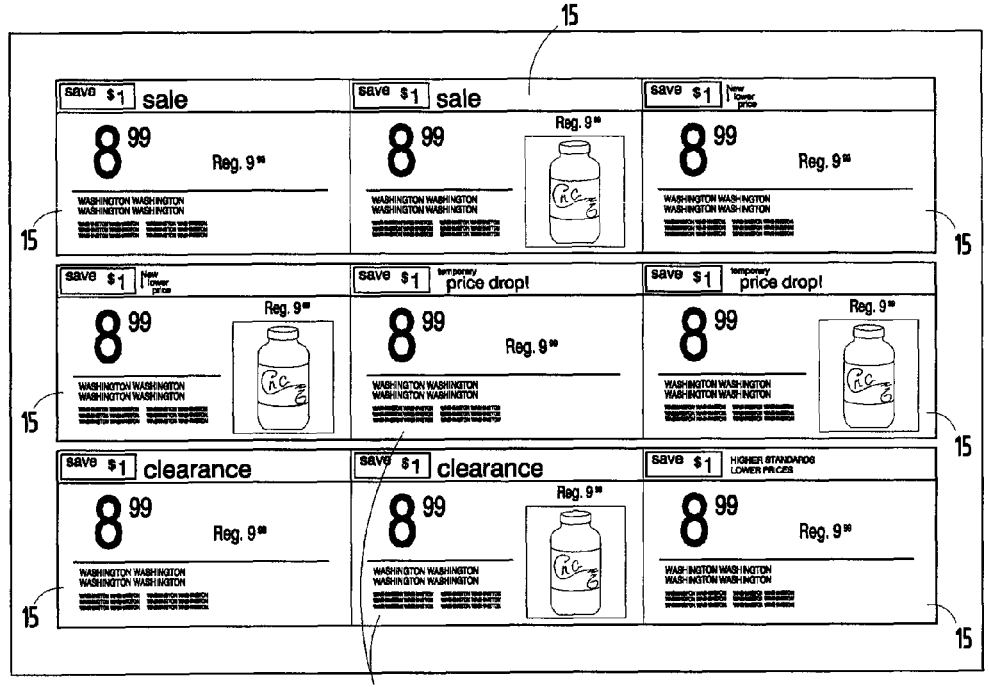
FIGS. 6-7 are two sheets with price information tags printed thereon.
Figure 7:

FIGS. 6-7 show two different sheets with customized price information tags 15 printed thereon. Notably, the printed tags are each different from each other. Several tags include very high quality/high resolution printing and pictures/photographs/symbols printed in multiple colors. They are arranged to be cut into individual price information tags, FIG. 6 having nine tags (each about 3"×5"), FIG. 7 having 10 tags (each about 2"×3.5"). The two sheets can be printed immediately after each other. The tags each include an eye-catcher section, such as "SAVE $1" or "sale," and also each include price information and product information. Several of the tags also include the above-noted high quality photographs of the product. Where desired, attachment structure is cut into the tags 15 (such as by forming top and/or bottom barbs or tabs, see FIG. 8-9) and/or adhesive or other attachment structure (see tags 20, FIG. 12). The tags 15 are preferably printed in order so that they are sequentially ordered to match a particular store product arrangement ("plan-o-gram") on store shelves.

Figure 9:
FIGS. 8-9 are front and side views of a particular price information tag.
Figure 8:
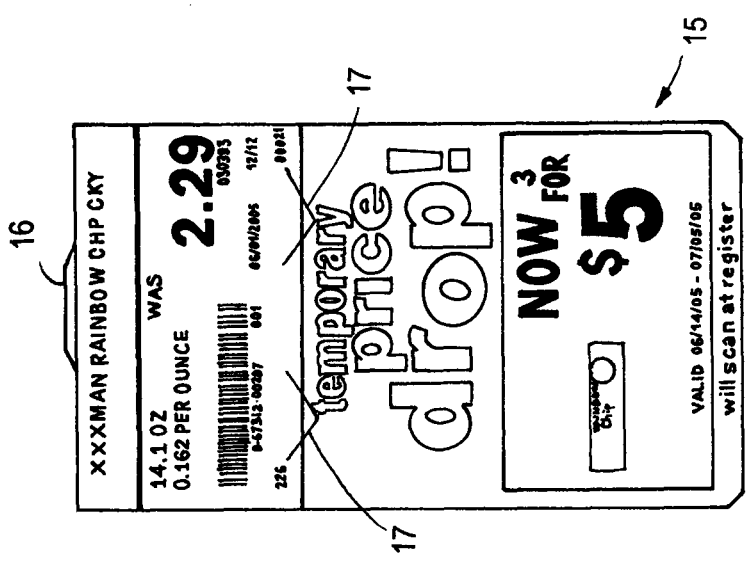

FIGS. 8-9 show a particular price information tag. The illustrated tag 15 is made from a sheet of 4 mm thick rigid PVC plastic material. However, the tag 15 can be made from another material of sufficient stiffness to form attachment barbs, such as 80# to 100# paper, cardboard or laminate). The sheet material is sufficiently stiff to be snappingly-attached (i.e., using the flexible attachment barbs) for attachment to a shelf-mounted channel (see FIGS. 10 and 13), with the integrally formed attachment barbs 16 and 17 engaging tops and bottoms of the channel. The illustrated top barb or tab 16 is elongated. The illustrated bottom barbs 17 are triangularly shaped with a flexible point 18. The barbs 17 are spaced apart to form with top barb 16 a three-point attachment matrix that stably engages a shelf-mounted channel (11).

FIG. 10 shows a tag 15 (similar to the tag shown in FIGS. 8-9) configured to attach to a channel 11 (also called a "holder" or "bracket") on a shelf 10. The tag 15 (FIGS. 11-12) is sheet of 4 mm thick rigid PVC plastic material 21 cut to size. A plurality of hooks or tabs 22 (three being shown) are die-cut into the blank 21. Adhesive 23 is placed along a top portion of the tab if desired. Indicia 24 are printed on a front surface of the tag. The top edge of the tag 15 can be linear or have protrusions (see the tag in FIGS. 8-9).

The present tag 15 can be attached in three different ways as shown in FIG. 13. In the first way, the tag 15 includes a top edge 25 tucked inside a top groove in the channel 11 and the tabs 22 are pushed to snap into the bottom groove in the channel 11. The attachment is extremely quick. The tag is very simple, with no additional attachment structure required (which provides significant cost savings for those stores having shelf-mounted channels 11). Also, the attachment is very secure. In the second attachment method, a different channel 12 is attached to a face of the shelf 10. The channel 12 includes a finger-like front tab 13 forming a friction abutment with a back surface of the channel 12. The top edge 25 of the tag 15 slips under the friction member for retention. In the third method, the tag 15 includes the adhesive 23 which is adhered directly to a front surface of the shelf 10, thus eliminating the need for a channel. It is contemplated that the tag 15 can include all three of the above-mentioned attachment structures or can include just one or two, or can include other known attachment structure such as holes, apertures, and/or various arrangements of attachment tabs.

By the above system, the inventor's study showed that an existing known company could cut printing costs by over one million dollars per year. Further, employee productivity is improved considerably, such as 40% for many employees, both when setting/hanging tags, and also for productivity in general manpower for managing/handling/printing tags. Also, the need for pre-printed stock is substantially eliminated. Still further, in-store errors are reduced, due to the use of sequentially arranged price information tags as supplied to the individual retail outlet stores. Problems associated with out-of-stock items are reduced, due to the shortened lead times required for supplying the present customized price information tags. Also, "false fronts" and mis-information is reduced or eliminated. Also, there are faster "resets," where old tags are replaced with new updated price information tags, such as up to 40% faster resets where sequentially arranged price information tags are supplied. There is expected to be a considerably faster stocking, with substantial reduction in mis-stocks and mis-information on stocked items. Also, the present system will greatly reduce the need for consumer price checks and will greatly improve correct posting of product-to-price identification. Still further, high quality multi-color photographs and color images are on the price information tags, resulting in higher sales volumes based on consumer attraction to the signage (based on recent marketing studies). There will be improved quality over B&W toner commonly used in black laser printers, and improved paper quality due to the printing capabilities of the digital presses. There is a reduced need for toner cartridges and laser printer consumables and maintenance. Also, signs will be cut by high-volume accurate cutters, as opposed to less accurate local cut or tear systems now used at many retail outlets. Also, signs will be shipped in "plan-o-gram" order according to the layout of a particular store, promoting efficient installation, less wasted manual time, and improved accuracy of sign postings.

Modification

Figure 18:
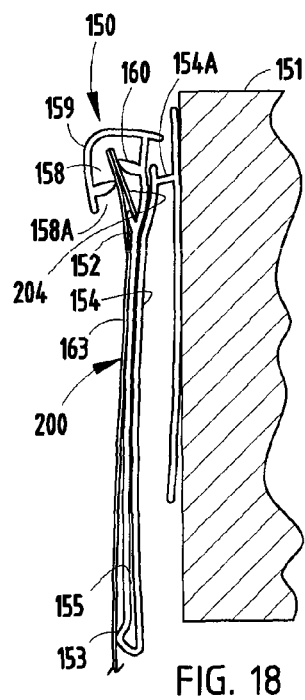
FIG. 18 is a side view of the holder from FIG. 17 supporting the novel price tag of FIGS. 14-16, FIG. 18A being an enlarged view of a top of the extruded holder.
Figure 19:
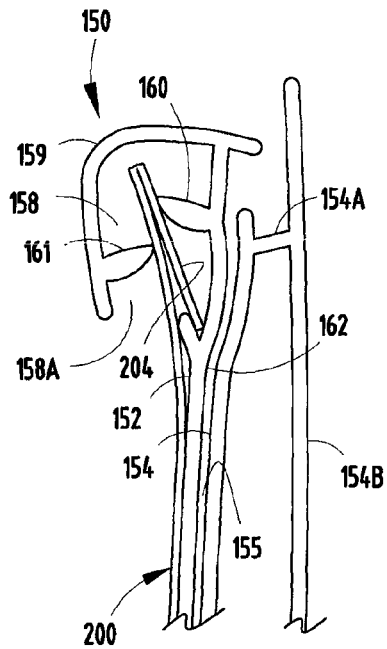
FIG. 19 is a side view of the extruded holder in FIG. 18 and including a base price tag positioned within the extruded holder and with the supplemental price tag from FIG. 15 attached to the extruded holder.

A price information tag 200 (also called a "price tag") (FIGS. 14-16A) includes a body 201 made from a sheet of material similar to that of tag 15 (FIG. 8-9), and is printed and die cut similar to the processes noted above for tags 15. Price tag 200 improves on tag 15 and provides yet additional attachment structure. The illustrated bottom barbs 202 are cut into the body 201 and are formed from a continuous wavy slit to have three spaced-apart downwardly-extending barbs 202. Each barb 202 has a short flat bottom edge which tends to better hold its shape and retaining qualities better than a pointed barb. A length of the flat bottom edge can be varied, depending on the durability needed and depending on the material of body 201 used. A score 203 (or slit) is cut about half way into the material at a location about $1/8^{th}$ to $3/16$ inch down from a top of the body 201, and more preferably about $5/32$ inch down from the top of the body 201, leaving a thin section of material 203A forming a living hinge. Notably, it is contemplated that a slight fold will also work, or a dashed cut line. This creates a top counter-engaging attachment flange 204 that can be folded, as illustrated in FIGS. 16-16A. The attachment flange 204 is particularly well adapted for positive and secure attachment to the prior art holder 150 illustrated in FIG. 18, as discussed below and shown in FIG. 19. A discussion of the prior art holder 150 is found earlier in this disclosure.

The price tag 200 (FIG. 19) can be upwardly inserted into the front throat 158A with a quick upward movement of the price tag 200. When thus inserted, the folded attachment flange 204 snaps into engagement with the inner flange 160 and holds the price tag 200 very securely and also squarely in position in the holder 150 on the store shelf. A reason for the sureness of engagement by the attachment flange 204 is because the integral hinge material 203A of body 201 (i.e., that part not cut by slit 203) remains sufficient to bias the attachment flange 204 outwardly away from the body 201 at a reverse angle, such that it effectively locks the price tag 200 in a secured position. The folded attachment flange 204 is short enough to easily snap over the holder's flange 162, but long enough such that it prevents the price tag 200 from moving to an angled position (which has a poor appearance on a store shelf . . . and which is a precursor to the price tag simply falling out). At the same time, the price tag 200 can be pulled out of holder 150 by a simple downward pull. This is because the attachment flange 204, when pulled with a conscious "tug," causes the tag 200 to bend and flex enough to "let go" without damaging or destroying the flanges 160, 161, or ridge 162 of the holder 150, and without leaving remnants of the price tag 200 in the retention area on the holder 150. As a result, the retention of the price tag 200 is positive and secure, but releasable. Notably, any of the additional attachment structures shown in FIG. 13 can also be used on the price tag 200.

Figures 20, 21:
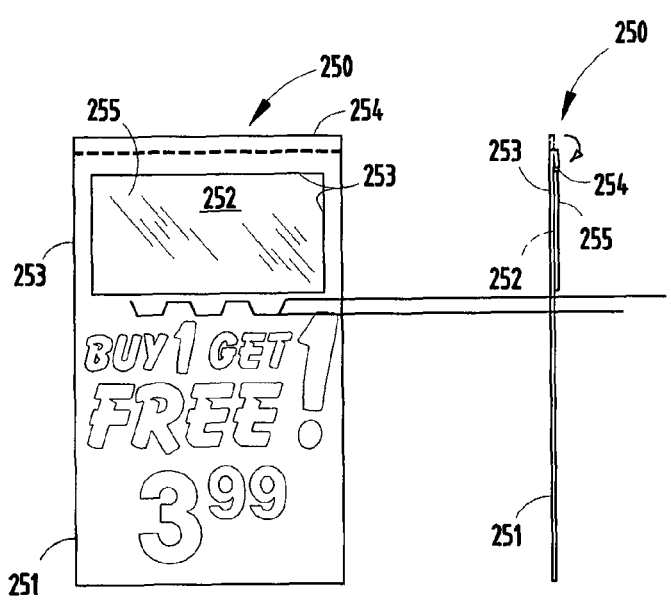
FIGS. 20-21 are plan and side views of a windowed price tag.
Figure 22:
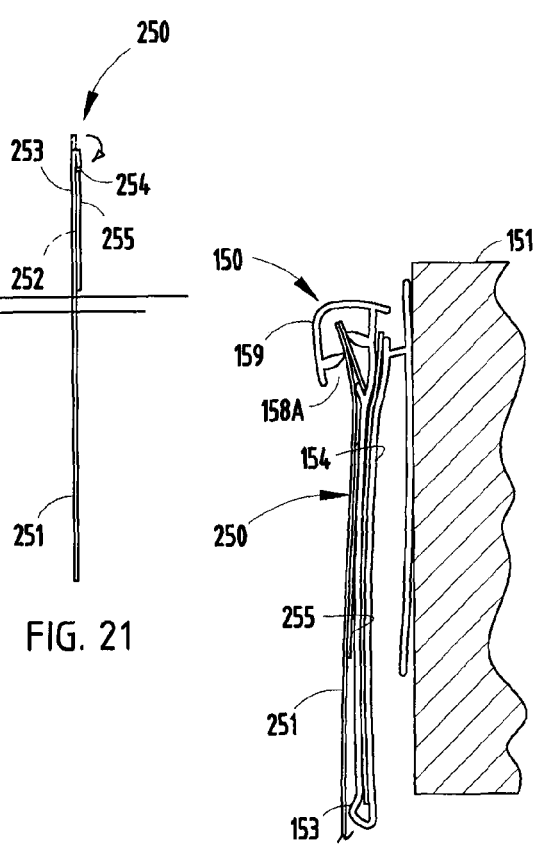
FIG. 22 is a side view of the extruded holder in FIG. 18 and including a base price tag positioned within the extruded holder and with the supplemental windowed price tag from FIG. 21 attached to the extruded holder, FIG. 22A being an enlarged view of a top of the price tag.
Figure 18A:
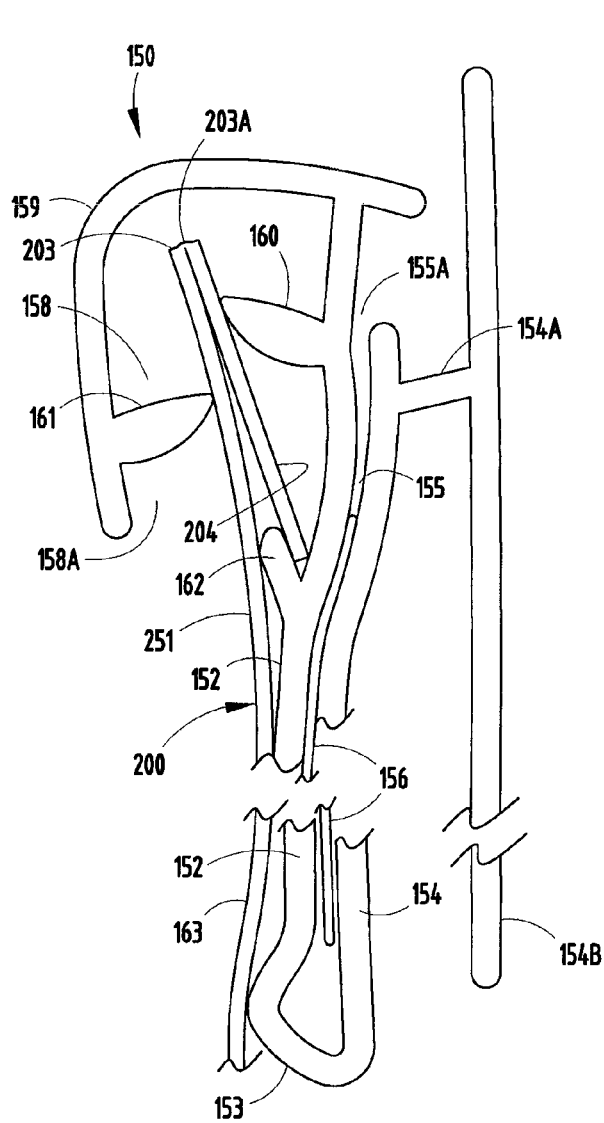
Figure 22A:
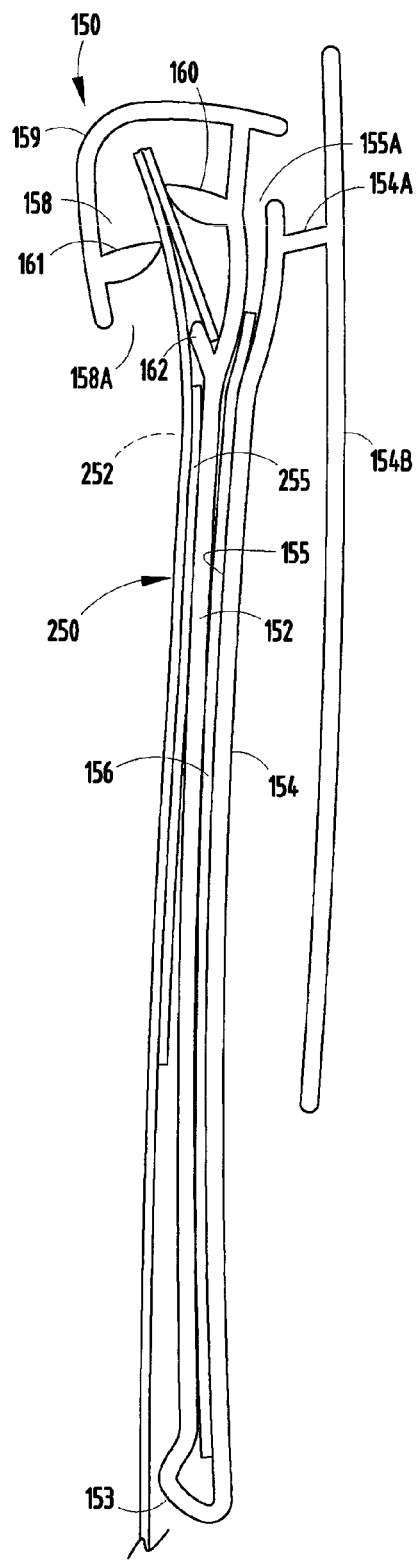

A price information tag 250 (FIGS. 20-21) includes a body 251 made from a sheet of material similar to that of tag 15 (FIGS. 8-9) and tag 200 (FIGS. 14-17), and is printed and die cut similar to the processes noted above for tags 15. For example, the body 251 can be a paper of 80# or 100# weight. The body 251 of tag 250 has a window 252 cut therein, as defined by perimeter material 253. The perimeter material 253 can include a bendable attachment flange 254 similar to the attachment flange 204 if desired. In a preferred form, a clear plastic sheet 255 is attached to a back side of the body 251 covering the window 252. A similar clear plastic sheet can also be attached to a front of the body 251 if desired so as to provide a smoother front region around the window 252. It is contemplated that a clear double-sided tape can also be adhered or laminated to a back of the clear plastic sheet 255, or that a one-sided clear tape (not shown) can be secured to the body 251 in place of the plastic sheet 255, with the tape's adhesive facing rearward (such as if a sticky second attachment structure for adhering to a shelf front is desired on the price tag). As shown in FIG. 22 (and FIG. 22A), this allows the price information tag 250 to be attached to the holder 150, but allows the base tag 156 to continue to be visible through the window 252. It is noted that the window-type price information tag 250 provides a significant cost advantage over other window-type tags, because the price information tag 250 is primarily a lower-cost paper (or stiff plastic film), while the more expensive clear plastic with adhesive extends only a length of the window area on the price tag 250. This is seen to be a great price advantage, when one considers that literally millions of these window-type price tags are used each year.

Figure 23:
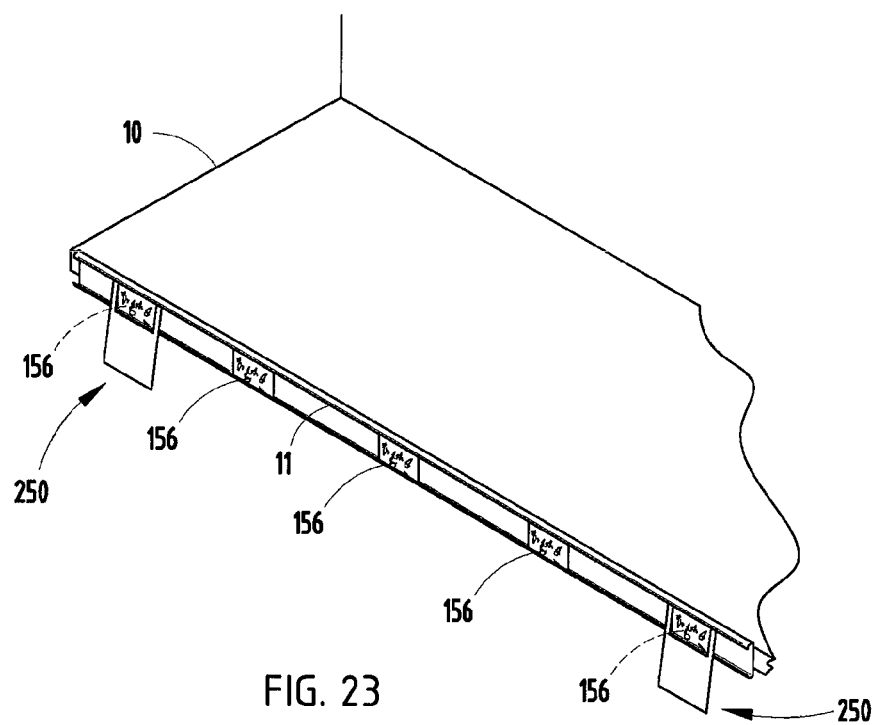
FIGS. 23-24 are a perspective and an enlarged side view of the windowed price information tag of FIG. 20 attached to a store shelf front in a position overlaid on a "main" price information tag.
Figure 24:
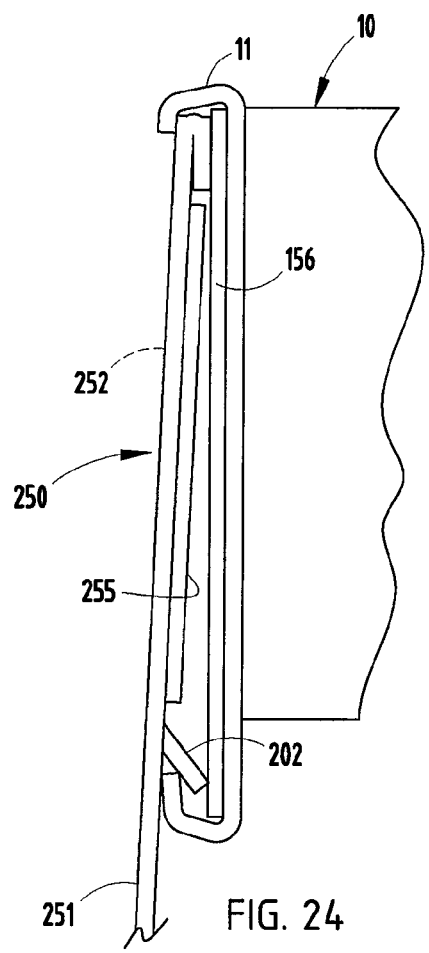

The window price information tag 250 con also be used on a more traditional price holder channel 11 on a shelf 10, as shown in FIGS. 23-24. The channel 11 is C-shaped, and includes top and bottom lips for engaging top and bottom edges of a "main" price information tag 156. The window 252 of tag 250 (with or without clear panel 255) allows the main price tag 156 to be seen, yet displays information printed on its body 251, such as for indicating in-store specials. The tag 250 includes a top edge for engaging the top lip of channel 11, and includes bottom barbs 202 for engaging the bottom lip of channel 11 in a position overlaying the main price information tag 156.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A method of providing supplemental/temporary product information for products on store shelves, comprising steps of:
   providing a store shelf with a front edge and a tag holder on the front edge, the tag holder having front and rear panels defining an upwardly-open slot for receiving a main price tag and further having a slip-fit top attachment system at a top of the front panel that includes a downwardly-open front throat defined by protrusions;
   placing a main price tag into the upwardly-open slot in a position visible through the front panel, the main price tag being a first sheet with first indicia thereon;
   providing a supplemental information tag with a tag body and a folded attachment flange connected to the body by a fold and having a downward-extending free edge, the tag body of the supplemental information tag including a die-cut second sheet with second indicia printed thereon and further including a clear panel window;
   temporarily attaching the supplemental information tag by sliding the top edge of the supplemental information tag into the downwardly-open front throat with the downward-extending free edge of the folded attachment flange being biased outwardly by the fold to provide positive engagement with one of the protrusions of the slip-fit top attachment system, with the supplemental information tag being positioned in front of the main price tag with the window being positioned in front of a portion of the first indicia and with the front panel being entirely between and separating the main price tag and the supplemental information tag; and
   later, pulling the supplemental information price tag downwardly with sufficient force to overcome the positive engagement of the folded attachment flange to thus remove the supplemental information tag without disturbing the main price tag, thus temporarily attaching and later removing the supplemental information tag without disturbing the main price tag.

2. A combination for providing temporary product information for products on store shelves without removing existing product price tags, comprising:
   a store shelf with a front edge and a tag holder on the front edge, the tag holder defining an upwardly-open slot and further having a slip-fit top attachment system forward of the upwardly-open slot;
   a main price tag positioned in the upwardly-open slot in a position visible from a position in front of the tag holder, the main price tag being a first sheet with first indicia thereon; and
   a supplemental information tag with a tag body and a folded attachment flange along a top edge, the tag body of the supplemental information tag including a die-cut second sheet with second indicia printed thereon and further including a clear panel window; the folded attachment flange of the supplemental information tag securely engaging the slip-fit top attachment system with the window being positioned in front of a portion of the first indicia and with the front panel being entirely between and separating the main price tag and the supplemental information tag, but the folded attachment flange being sufficiently flexible so that the supplemental information tag can be removed by pulling sharply downwardly on the supplemental information tag to bend and thus overcome the secure engagement of the folded attachment flange and thus remove the supplemental information tag but without disturbing the main price tag.

3. The method defined in claim 1, wherein the top attachment system is angled to bias the body of the supplemental information tag toward the main price tag, wherein the main price tag, the front panel, and the supplemental information tag form an abutting laminar arrangement that facilitates reading the first indicia through the clear panel window.

4. The combination defined in claim 2, wherein the top attachment system is angled to bias the body of the supplemental information tag toward the main price tag, wherein the main price tag, the front panel, and the supplemental information tag form an abutting laminar arrangement that facilitates reading the first indicia through the clear panel window.

* * * * *